Nov. 14, 1939.   O. E. FISHBURN   2,179,927
POWER TRANSMITTING DEVICE AND CLUTCH THEREFOR
Filed July 27, 1936   2 Sheets-Sheet 1
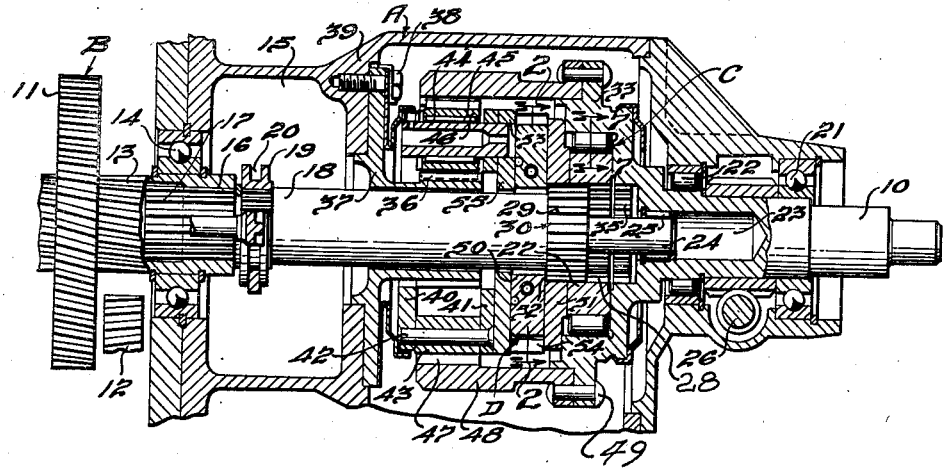
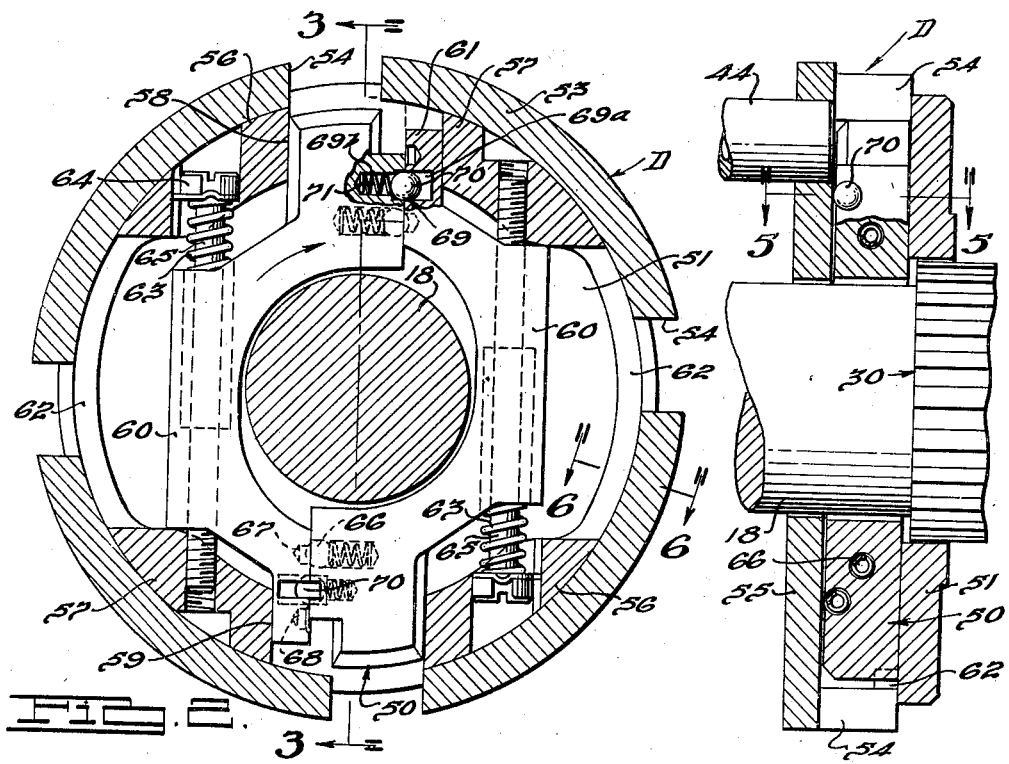
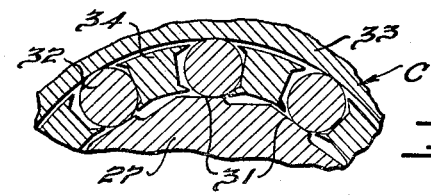
INVENTOR
Otto E. Fishburn.
BY
Harness, Dick, Patee & Harris
ATTORNEYS Nov. 14, 1939.  O. E. FISHBURN  2,179,927
POWER TRANSMITTING DEVICE AND CLUTCH THEREFOR
Filed July 27, 1936  2 Sheets-Sheet 2
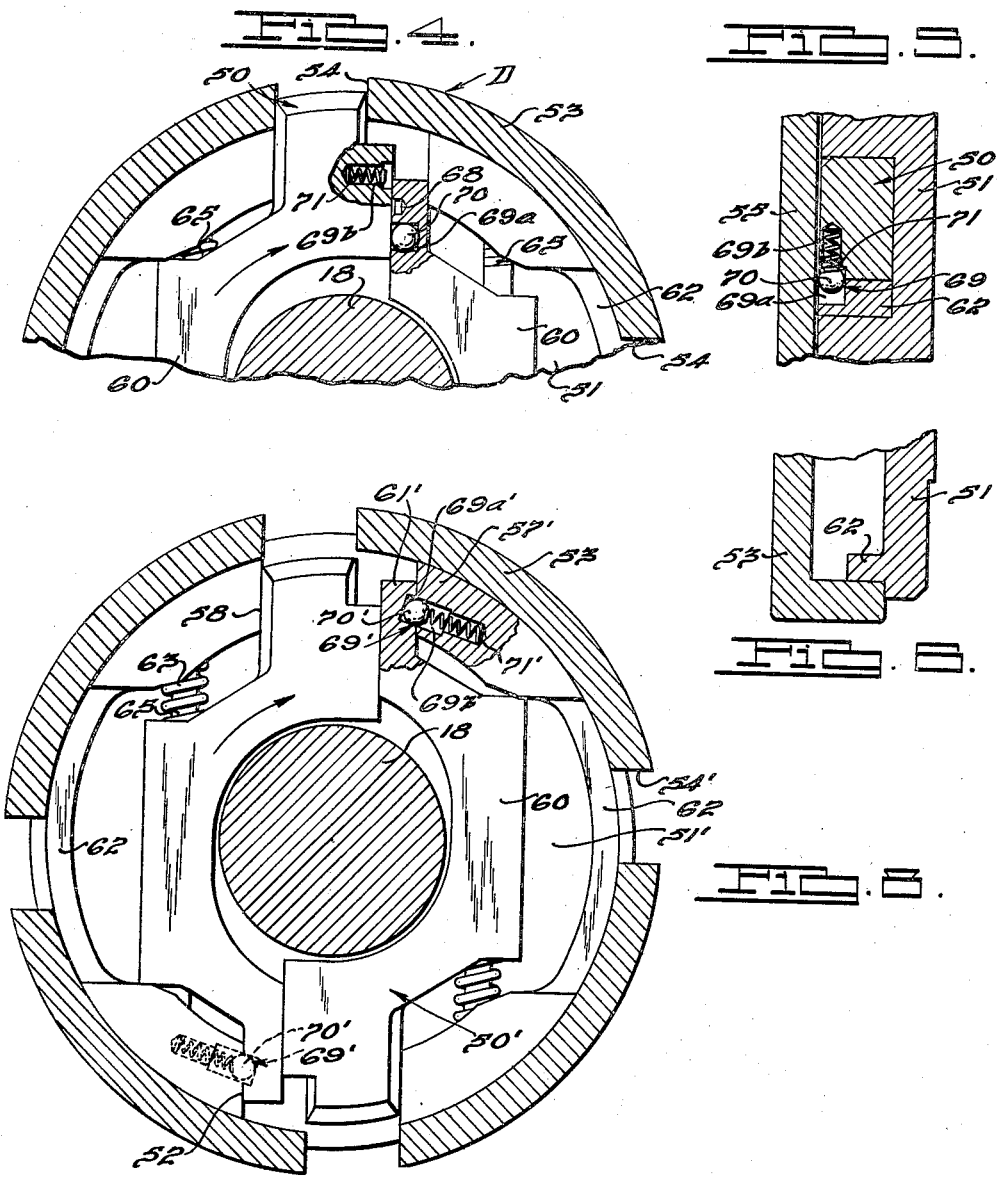
INVENTOR
Otto E. Fishburn.
BY
Harness, Dick, Pater Harris
ATTORNEYS.

Patented Nov. 14, 1939

2,179,927

UNITED STATES PATENT OFFICE 2,179,927

POWER TRANSMITTING DEVICE AND CLUTCH THEREFOR

Otto E. Fishburn, Detroit, Mich., assignor to Chrysler Corporation, Highland Park, Mich., a corporation of Delaware Application July 27, 1936, Serial No. 92,781

12 Claims. (Cl. 192—105)

This invention relates to power driving mechanisms especially adapted for use in driving motor vehicles and refers more particularly to improvements in control means for such driving mechanisms.

More specifically, I have provided improvements in centrifugal control devices including automatically operating clutches of the centrifugal force operated type in which a centrifugally operating clutching element is moved for positive engagement with a companion clutching element when the speeds of these clutching elements are substantially synchronized.

One object of my invention resides in the provision of an improved control means for controlling power driving mechanisms which are adapted under predetermined conditions to automatically effect the drive for the vehicle. My controlling means is preferably adapted for use in connection with either, or both, a speed ratio changing transmission of any desired type, or an auxiliary—preferably automatically operating—driving speed ratio for the vehicle, such as an overdrive ratio for example.

Another object of my invention is to provide an automatic overdrive mechanism between driving and driven shafts incorporating improved clutching means and latching means for controlling the operation of the clutching means.

To effect the operation of the aforesaid automatic overdrive mechanism, with which I prefer to illustrate my invention in the form of clutch controlling means, an automatically operating clutch of the centrifugal force operated type has been provided in which one or more centrifugally operated clutching pawls or elements forming one of the clutching structures is moved for positive engagement with a companion clutching structure when the speeds of these clutching structures are substantially synchronized.

This clutch controlling means, or anti-ratcheting device, is so arranged in the embodiment shown that operation of the centrifugal element is prevented until the speeds of the clutching structure are substantially synchronized. This control is preferably so constructed as to prevent movement of the centrifugal element when the driven shaft is being driven directly or in some manner other than through the overdrive, even though the centrifugal element is subjected to conditions otherwise tending to effect its movement toward clutching engagement. Such arrangement prevents undesired wear of the clutching means and noises incident to the "ratcheting" effect of certain types of clutching means and has other advantages which will presently be more apparent.

This controlling means, according to the preferred embodiment of one provision of my invention, consists of a novel latching means so arranged as to control the clutching means for the speed ratio drive, insuring against their improper operations, protecting the parts of the mechanism against undue wear and destructive influences, and simplifying the mechanism as a whole and the operation thereof.

A further object of my invention resides in the provision of an automatically operating device of the centrifugal force operated type having improved characteristics of operation.

Heretofore in automatically operating clutches and other drive controlling devices of this type, much trouble has been experienced from noisy shifting and bumping of the pawl cage against the shell carrying one or more companion clutching elements, or slots, when the pawl cage and the shell were operated with a clearance therebetween. My improved automatically operating clutch overcomes this undesirable condition, in this particular embodiment, by incorporating a flange portion in the pawl cage in which the shell may rotate freely, but the pawl cage is thereby prevented from bumping or shifting against the shell, as a substantially continuous bearing is provided for the pawl cage by the shell.

Further objects and advantages of my invention will be more apparent from the following detailed description of several illustrative embodiments of my invention, reference being had to the accompanying drawings in which:

Fig. 1 is a sectional elevational view of an overdriving mechanism incorporating my clutch controlling means.

Fig. 2 is a transverse sectional elevational view through the automatic clutch illustrated in the disengaged condition, the section being taken as indicated by the line 2—2 of Fig. 1.

Fig. 3 is a sectional view through the clutch shown in Fig. 2, the section being taken as indicated by the line 3—3 of Fig. 2.

Fig. 4 is a partial sectional elevational view corresponding to Fig. 2, the automatic clutch being shown in its engaged condition.

Fig. 5 is a partial sectional view showing the details of my means for controlling premature clutching movement of the pawls when the automatic clutch is in disengaged condition, the section being taken approximately as indicated by the line 5—5 of Fig. 3.

Fig. 6 is a partial sectional view showing the details of my pawl cage stabilized on the shell, the section being taken approximately as indicated by the line 6—6 of Fig. 2.

Fig. 7 is a sectional elevational view through a portion of the overrunning or free wheeling clutch, the section being taken as indicated by the line 7—7 of Fig. 1.

Fig. 8 is a sectional view corresponding to Fig. 2, showing another embodiment of my clutch controlling means.

With reference to the drawings, I have illustrated my driving mechanism A interposed between a speed ratio changing transmission B and the driven shaft 10, the latter extending rearwardly to drive the rear wheels (not shown) of the motor car or vehicle in the usual well-known manner, it being understood that I have elected to show my invention in association with a motor vehicle drive although my invention in its broader aspects is not necessarily limited thereto.

The transmission B may be of any suitable type such as the conventional selector type operated in the well-known manner through usual selector controls whereby the various adjustments may be made to the transmission to provide the speed ratios in the line of drive through the transmission.

Inasmuch as transmission B may for the most part be of general conventional construction and operation, I have shown in Fig. 1 only a portion of the gearing of this transmission, wherein 11 represents the gear adapted to be shifted by the usual reverse selector control (not shown) rearwardly or to the right for engagement with the usual reverse idler gear 12 to effect a reverse drive from the normal direction of drive to the driven shaft 10.

The power coming from the usual engine or other prime mover (not shown) which may be located forwardly of transmission B, drives the transmission and the power is taken from this transmission by a power driving means or shaft 13 rotatable in a bearing 14, the shaft having a portion extending rearwardly into the shifting space 15 of the driving mechanism A. This rearwardly extending portion of shaft 13 is provided with a rearwardly opening splined bore 16 adapted to receive the forwardly extending splined end 17 of the shiftable driving shaft 18, shafts 13 and 18 at all times rotating together by reason of the engaging splines 16 and 17. The driving shaft 18 carries a collar 19 having an annular groove 20, this collar being adapted to axially shift the shaft 18 with respect to the shaft 13 as will be more particularly hereinafter apparent.

The driven shaft 10 extends forwardly in bearings 21, 22 and is provided with a forwardly extending bore 23 slidably piloting the rearwardly extending reduced end 24 of shaft 18, a bearing 25 being provided between the bore 23 and the end portion 24. The usual speedometer take-off drive is illustrated at 26.

An overrunning or free-wheeling clutch C, best shown in Figs. 1 and 7, is incorporated in the driving mechanism A as a part of the primary driving means between driving shafts 13 and 18 and driven shaft 10. The inner cam member 27 is driven by internal splines 28 engaged by the splines 29 of a clutch gear 30 formed as a part of the driving shaft 18. The inner cam member 27 has cam faces 31 engaged by cylinders 32 so that by the driving rotation of shaft 18, the high sides of cam faces 31 will wedge the cylinders 32 between cam member 27 and the outer cylindrical driven member 33 of the overrunning clutch to establish a direct drive thereto. The usual spacers 34 maintain the cylinders 32 in spaced position, and since the driven free-wheeling part 33 is a forward extension of driven shaft 10 as shown in Fig. 1, it will be apparent that whenever the engine or driving shaft 13 slows down, the vehicle and driven shaft 10 may, by reason of the clutch C, overrun the driving shaft, other conditions permitting such action as will be presently apparent.

Intermediate the driven member 33 of the free-wheeling clutch C and the bearing 25, the driven shaft 10 is provided with an annular series of internal splined teeth or jaws 35 complementary to the splines 29 of the shiftable clutch 30, the splines 35 and 29 being adapted to interengage when the shaft 18 is shifted rearwardly.

While various types of gearing for the speed ratio or overdrive may be employed, I have elected to illustrate planetary gearing comprising a sun gear 36 fixed by a bracket 37 and fasteners 38 to the casing 39 of the overdrive mechanism A, the shaft 18 freely rotating within this sun gear. A planet carrier is provided with axially spaced rings 40, 41 connected at circumferentially spaced intervals by the tie members 42, the planetary carrier rings 40, 41 being maintained in spaced relationship by sleeves 43 respectively carried by the tie members 42.

Spaced circumferentially between the tie members 42 are the planet gear shafts 44 supported by the rings 40, 41 and journalled by a bearing 45 on each of the shafts is a planetary gear pinion 46 meshing with the aforesaid sun gear 36. The planetary gears 46 also mesh with an internal gear 47 carried by a sleeve 48 which projects forwardly from the outer member 33 of the free-wheeling clutch C. The sleeve 48 is rigidly connected to member 33 by fasteners 49, the sleeve 48 having its axis concentric with the axis of shaft 10.

An automatic clutch D has its centrifugally actuated clutching elements or pawls 50 carried by a pawl cage 51 which has an annular series of internal teeth or splines 52 illustrated in Fig. 1 as being interengaged by the splines 29 of the shiftable clutch gear 30, it being understood that I have illustrated the principles of my invention in conjunction with the device D shown as a clutch.

The companion cooperating clutch member of the automatic clutch D is provided by a cylindrical clutching structure or shell 53 having an annular series of spaced pawl receiving slots or openings 54, the shell 53 having an inwardly extending forwardly located plate or flange 55 receiving the rearwardly extending ends of the planetary gear shafts 44 whereby the shell 53 is driven by the planetary gears 46. The flange 55 thus forms a portion of the slotted clutching structure and is rotated with the planetary carrier parts 40 and 41.

The pawl cage 51 of the clutch D, best shown in Figs. 2 and 4, is provided with diametrically arranged pairs of lateral extensions or pawl guides 56 and 57. Extensions 56 have pawl engaging faces 58 and extensions 57 have similar bearing faces or guideways 59. Fitting within shell 53 are a pair of the said pawls 50, each having a face in sliding engagement with a face or guideway 58 of extension 56 and each extending generally inwardly of the pawl carrying cage.

Thus, each pawl 50 is formed with a yoke portion 60 normally seated on an extension 57, each yoke portion having a guide counterbalancing portion 61 slidable intermediate a guideway 59 and the sides thereof in engagement with the guideway 58.

In this particular embodiment of my pawl cage stabilizer I have employed an annular flange 62, best shown in Fig. 6, formed on the periphery of the pawl cage 51 and being journalled in shell 53. The flange 62 extends circumferentially around the pawl cage 51 and provides a cylindrical bearing connecting the guideways 58 and 59 to journal thereon the shell 53.

To normally urge the pawls 50 inwardly of the pawl cage 51 to position the parts as shown in Fig. 2, springs 63 are provided, each spring acting on the head 64 of a screw bolt 65 threadedly engaging suitable openings in extensions 57, the yoke portions 60 being also provided with suitable openings to slidably receive the respective bolts 65 and springs 63 cooperating therewith.

When pawls 50 move outwardly into slots 54, such movement is limited by engagement of yoke portions 60 with extensions 56, the yoke portions sliding on bolts 65.

Each pawl 50 may, if desired, be provided with a spring actuated ball detent 66 releasably engaging either of recesses 67 or 68 to assist in holding the pawls in stabilized condition, to prevent hunting prior to their release for outward and inward clutching movement respectively, and to govern the clutching characteristics. If desired, the detents may be omitted.

Preferably each pair of pawls 50 is provided, in accordance with the illustrated embodiment of my clutch controlling means, with two ball detents operating within two recesses 69, each recess extending into both a guide counterbalancing portion 61 and the side of one of the pawls 50 with which the portion 61 is in sliding engagement.

The portions 69a and 69b of the recess 69, in the portion 61 and the pawl 50 respectively, are aligned or registered with each other when the pawls 50 are in their disengaged condition of Figs. 2 and 3. Each recess 69 has a ball 70 capable of movement therein, the ball protruding slightly from the recess 69 in the forward face of the pawls 50. A yielding means, which may be a spring 71 of small force, is housed in the recess portion 69b so that the ball 70 is normally urged into the recess portion 69a. The recess portion 69b extends sufficiently into the pawl 50 to permit the maximum movement of the ball 70 in that direction against the pressure of spring 71 to evenly position the ball between the pawl 50 and the guide counterbalancing portion 61 to prevent movement thereof until the ball is moved to its other position. The spring 71 extends sufficiently to the face of the pawl 50 to maintain the ball 70, under certain conditions of the driving mechanism A, entirely within the recess portion 69a.

The recess 69 is so positioned that when the pawl 50 engages one of the slots 54, the recess portion 69a carrying the ball 70 will not project completely away from the pawl. This positioning of recess 69 will thereby prevent the ball 70 from dropping out when the pawls 50 are in the engaged position.

The ball 70 is adapted to be supported fore and aft by the flange 55 and the recess 69 respectively as shown in Figs. 1 and 5, and is maintained in its Fig. 2 latched position by the friction and relatively slower rotation of flange 55 with respect to the rotation of the pawls 50 while the mechanism A is in normal direct drive position, as will hereinafter be more apparent. When the rotational speed of the pawls and the driving shaft 18 slows down for the synchronizing action of the clutching structures, the ball 70 is moved to its other or released position of Fig. 4.

In the operation of the driving mechanism A and my automatic clutch control, according to the aforesaid illustrated embodiment thereof, the position of the parts in Figs. 1, 2, 3, 5 and 8 is the normal driving condition of the vehicle wherein the overdrive may take place. Thus, the drive coming from the engine and thence through transmission B, passes from transmission driving shaft 13 to the driving shaft 18, the drive then being transmitted through clutch 30 to the free wheeling cam 27, through the free wheeling clutch C and thence to the outer free wheeling member 33 and driven shaft 10 to the vehicle driving ground wheels. Under such conditions the motor vehicle will be directly driven between driving and driven shafts 13 and 10 respectively, the driven shaft 10 overrunning the driving shaft 13 whenever the engine and driving shaft are slowed down below the speed which is required to establish a drive to the motor vehicle.

When the speed of driving shaft 18 is below the critical speed necessary for clutching engagement of pawls 50 with slots 54, the position of the automatic clutch parts being illustrated in Figs. 1, 2, 3 and 5, each ball 70 will be carried to its latched position of Figs. 2 and 5 by friction and slower relative rotation of the flange 55 in the same direction.

Let it now be presumed that the motor vehicle is further accelerated under power from the engine to rotate the driving shafts 13 and 18 in said direct one-way drive above the critical speed of the pawls 50, the pawls will be prevented from moving toward clutching engagement with the slower moving slots 54 by the balls 70 being maintained in the position of Figs. 2 and 5. The clutching movement of pawls 50 under those conditions will be prevented by the interlocking action of each of the balls 70.

Now let it be presumed that the operator of the motor vehicle desires to effect engagement of the automatic clutch D to drive the motor vehicle with the overdrive in operation. The driver will then diminish or release the power from the engine by withdrawing his foot from the usual accelerator pedal and the speed of the engine will thus rapidly decelerate although, by reason of the over-running clutch C the motor vehicle will continue to travel above the aforesaid critical speed, it being presumed for the moment that the motor vehicle is traveling on a level roadway without decelerating or retarding influences.

As the engine decelerates, the pawls 50 will likewise decelerate, the pawls are held retracted by balls 70 to thereby smoothly pass within the shell 53 and beyond the successive slots 54 until the engine has decelerated to substantially the continuing speed of the shell. The shell 53 and cage 51 are thus substantially synchronized, the pawls 50 being urged outwardly under centrifugal force, but being held against movement, and the engine continuing to decelerate until the R. P. M. of the pawl cage is just less than that of the shell 53 so that the shell now begins to very slowly rotate in the same direction relatively faster than the pawls for a fraction of a revolution beyond exact synchronism. Under this condition each ball 70 will be moved to its other extreme position in recess portion 69a, assisted by spring 71 when employed, whereupon the pawls 50 will be projected toward complete clutching engagement with slots 54 as in Fig. 4.

As the rotational speed of the driving shaft 18 diminishes during the overrunning action, the driving shaft speed as well as that of the pawls 50 will ordinarily fall below that of the slotted shell 53 for a maximum rotation of one-quarter of a complete revolution of the pawl cage 51, assuming the slots to be spaced 90°, during which time the balls 70 are moved from their Fig. 5 positions to their Fig. 4 positions, and during which time the pawls will be projected outwardly to clutchingly engage the next approaching slot. I have illustrated these slots 54 as being spaced 90°, although it will be apparent that additional slots may be provided, if desired, and to thereby reduce the relative rotation below exact synchronism for the clutching engagement.

However, with the slots 54 arranged as illustrated, the centrifugal clutch D will engage substantially during synchronism of the clutching structures and without any perceptible shock to the driving mechanism or to the occupants of the motor vehicle. It will furthermore be understood that the relationship of the pawls 50 with the springs 63 is such that the pawls will be urged outwardly at the desired motor vehicle speed notwithstanding the reduction in the driving shaft speed relative to the driven shaft during the overrunning action preparatory to synchronizing the clutching structures for effecting their engagement.

Upon movement of the pawls 50 toward clutching engagement, and during such engagement with slots 54, each ball 70 is maintained in the Fig. 4 position from which it is evident that this ball cannot enter the recess portion 69ᵇ.

If my described clutch were not incorporated, and with pawls as heretofore generally used, the pawls 50 would move toward slots 54 before these two structures were properly synchronized, as during direct drive above the critical speed of the centrifugal clutch. Thus, before synchronism occurred, the pawls 50 would noisily jump over the slots 54 and knock off or round the corners of the pawls and slots during an undesirably long overrun of these clutching structures. But, with my described clutch controlling means, the pawls are withheld until proper synchronism of these clutching structures is effected before the pawls 50, one of these clutching structures, are released toward the slots 54, the other clutching structure.

Continuous support is provided by my pawl cage stabilizer for the pawl cage 51 during the operation of driving mechanism A, regardless of whether the pawls 50 are engaged with slots 54. Thus the annular flange 62, formed in this embodiment on the periphery of the pawl cage 51, is continuously rotatably supported by the shell 53 to prevent the pawl cage from bumping or shifting against the shell during rotation.

Referring again to the operation of the driving mechanism A in the two-way overdrive condition, the driven shaft 10 is driven through the auxiliary planetary gearing and the clutch C provides the necessary overruning between the outer and inner clutch parts by reason of the difference in speeds of these parts. Thus, the drive passes from driving shafts 13 and 18 through clutch 30, pawl cage 51 to the pawls and thence to the shell 53. From the shell 53 the drive passes to the planetary gears 46, these gears serving to rotate the sleeve 48 and driven shaft 10 at a speed greater than that of driving shafts 13 and 18 by the amount of overdrive ratio afforded by the auxiliary gearing.

The automatic clutch D will remain in engagement until the motor vehicle is decelerated to some predetermined speed below the critical speed, whereupon the primary springs 63 will tend to urge the pawls 50 inwardly. Thereupon, the pawls 50 will move inwardly to their position of Figs. 1, 2, 3 and 5 after overcoming the action of the detent balls 66 acting in recesses 68. Upon the inward movement of pawls 50, the recess portions 69ᵃ and 69ᵇ will again be aligned and each ball 70 of my control means will be carried to its extreme position of Figs. 2 and 5 when the vehicle is again accelerated to drive through the overrunning clutch C.

It will be understood that a single assembly of a pawl 50 and ball 70 may be provided, if desired.

In the foregoing description of the driving mechanism, it has been presumed that the parts were positioned as shown in Fig. 1, reference being made particularly to the position of shifting clutch 30 which has been presumed to have remained in driving engagement with the pawl cage 51 and the free wheeling cam 27. When suitable means are provided for shifting the collar 19 rearwardly in response to the vehicle being driven in reverse or in response to a suitable remote control for the driver, the shifting clutch 30 is moved as aforesaid to connect shaft 18 directly to the driven shaft 10 by reason of engagement of splines 29 and 35, while maintaining the connection with cam 27. Thus, the overrunning clutch C and automatic clutch D are rendered ineffective and a two-way drive established between shafts 18 and 10.

While I have illustrated the balls 70 as frictionally engaging the flange 55 of the clutching structure carrying slots 54, it will be apparent that the operation of these ball detents will not be changed in the event that they engage any other surface which is rotatable in unison with the slotted clutching structure. It is with this in mind that I have referred to these ball detents cooperating or engaging with the clutching structures throughout my foregoing description and claims appended hereto.

Referring now to Fig. 8, I have shown another embodiment of my automatic clutch control and improved centrifugally operated clutch, the construction and operation being substantially the same as that illustrated in the earlier described embodiment, and I have indicated members of different construction but similar function by primed reference characters.

Preferably each pair of pawls 50' is provided with two ball detents operating within two recesses 69', each recess extending into both a guide counterbalancing portion 61' and one of the lateral extensions 57'. The portions 69ᵃ' and 69ᵇ' of the recess 69', in the portion 61' and the extension 57' respectively, are capable of being aligned when the pawls 50' are in their disengaged condition of Fig. 8. Each recess 69' has a ball 70' capable of movement therein, the ball protruding slightly from the recess 69' in the forward face of portion 61' and extension 57'. A spring 71' of relatively small force is attached to and housed in each recess portion 69ᵇ' so that each ball 70' is normally urged into the position shown directly between the portion 61' and extension 57' to prevent movement thereof until the ball is moved to its other position. The recess 69' extends sufficiently into the extension 57' to permit, under certain conditions of the mechanism A, the maximum movement of the ball 70' in that direction against the pressure of spring 71' to entirely house the ball therein.

The recess 69' is so positioned that when the pawls 50' engage the slots 54', the recess portion 69b' carrying the ball 70' and spring 71' will not be left entirely uncovered by the inward movement of the portion 61'. This positioning of recess 69' will prevent the ball 70' from dropping out when the pawls 50' are in the engaged position.

The ball 70' is adapted to be supported fore and aft by the flange 55 and the recess 69' respectively somewhat similarly to the ball 70 in the earlier embodiment. Thus, the ball 70' is maintained in its Fig. 8 position by the friction and relatively slower rotation of flange 55 with respect to the rotation of the pawls 50' while the mechanism is in normal direct drive position. When the rotational speed of the pawls 50' and the driving shaft 18 slows down for the synchronizing action of the clutching structures, the ball 70' is moved to its other position by the change in relative rotating speeds of the pawl cage 51' and shell 53 in the same direction to allow the pawls 50' to engage slots 54.

When the pawls 50' are urged inwardly by springs 63 to again establish a direct drive, the recess portions 69a' and 69b' are once more aligned. Thereupon as the vehicle is accelerated, the cage 51' rotates faster than the flange 55, and the slower rotation of the flange frictionally carries the ball 70' to its Fig. 8 position, assisted by spring 71' when used.

Although I have illustrated my invention in connection with an overdrive mechanism for motor vehicles, I desire to point out that this is but one useful application or use of my improved automatic control device. My improved automatic control may be used to advantage whenever controlling action between two relatively rotatable parts is desired, particularly where such action is to be automatically responsive to desired conditions of relative rotatable speeds of the two members to be engaged or disengaged.

I, furthermore, do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In an automatic clutch for drivingly connecting driving and driven shafts having releasable direct drive means operably associated therewith, said clutch comprising clutching structures respectively adapted for driving connection with said shafts for rotation in the same direction at relatively different speeds with one of said clutching structures leading the other during said direct drive, one of said clutching structures comprising a clutching element operated by centrifugal force to positively clutch with the other of said clutching structures when the rotational speeds of said clutching structures are approximately synchronized, and means rotatable with one of said clutching structures and operably engaging the other of said clutching structures for releasably holding said clutching element against centrifugal force movement during said direct drive, said holding means operating to release said clutching element in response to a reduction in the speed of said leading clutching structure to a speed thereof slightly less than that of the other of said clutching structures.

2. In an automatic clutch for drivingly connecting driving and driven shafts having releasable direct drive means operably associated therewith, said clutch comprising clutching structures respectively adapted for driving connection with said shafts for rotation in the same direction at relatively different speeds with one of said clutching structures leading the other during said direct drive, one of said clutching structures comprising a clutching element operated by centrifugal force to positively clutch with the other of said clutching structures when the rotational speeds of said clutching structures are approximately synchronized, and means rotatable with one of said clutching structures and operably engaging the other of said clutching structures for releasably holding said clutching element against centrifugal force movement during said direct drive, said holding means including a latching element carried by one of said clutching structures and engaging the other, said latching element being urged into a position for holding said clutching element against centrifugal force movement during said direct drive and being urged into a second position for releasing said clutching element in response to a predetermined drop in the rotational speed of said leading clutching structure to a speed thereof slightly less than that of the other of said clutching structures.

3. In combination with driving and driven shafts, releasable direct drive means between said shafts, relatively rotatable clutching structures one comprising a centrifugal force operated clutching element adapted to engage the other of said structures when the speeds of said structures are approximately synchronized, means for driving said clutching structures at relatively different speeds, one from said driving shaft and the other from said driven shaft during said direct drive, and means rotatable with one of said clutching structures and operably engaging the other of said clutching structures for releasably holding said clutching element against centrifugal force movement during said direct drive, said holding means operating to release said clutching element in response to a reduction in the speed of the faster rotating clutching structure to a speed thereof slightly less than that of the other of said cluching structures.

4. In combination with driving and driven shafts, releasable direct drive means between said shafts, relatively rotatable clutching structures one comprising a centrifugal force operated clutching element adapted to engage the other of said structures when the speeds of said structures are approximately synchronized, means for driving said clutching structures at relatively different speeds, one from said driving shaft and the other from said driven shaft during said direct drive, and means operably engaging said clutching structures for releasably holding said clutching element against centrifugal force movement during said direct drive, said holding means including a latching element rotatable with one of said clutching structures and engaging the other, said latching element being so constructed and arranged as to hold said clutching element against centrifugal force movement during said direct drive and to release said clutching element in response to a predetermined drop in the rotational speed of the faster rotating clutching structure relative to the speed of the other of said clutching structures.

5. In an automatic clutch for drivingly connecting driving and driven shafts having releasable direct drive means operably associated therewith, said clutch comprising clutching structures respectively adapted for driving connection with said shafts for rotation in the same direction at relatively different speeds with one of said clutching structures leading the other during said direct drive, one of said clutching structures comprising a clutching element operated by centrifugal force to positively clutch with the other of said clutching structures when the rotational speeds of said clutching structures are approximately synchronized, and means releasably holding said clutching element against centrifugal force movement, said holding means comprising a ball detent rotatable with one of said clutching structures and frictionally engaging the other of said structures for movement in positions of holding and releasing said clutching element in response to variation in relative rotation of said clutching structures.

6. An automatic clutch for drivingly connecting driving and driven shafts comprising a rotatable clutching structure adapted to be driven by one of the shafts at the same speed therewith, a second rotatable clutching structure adapted to be driven from the other of said shafts at a speed different therefrom when said driving shaft directly drives said driven shaft, one of said clutching structures being movable into clutching engagement with the other, and latching means rotatable with one of said clutching structures and cooperating with the other of said clutching structures to prevent clutching engagement of said movable clutching structure until a reversal of relative rotation of said clutching structures is effected.

7. In a centrifugally operated clutch for drivingly connecting co-axial relatively rotatable driving and driven shafts, a relatively rotatable pawl carrying structure adapted to be driven by one of said shafts at the same speed therewith, a relatively rotatable pawl engaging structure adapted to be driven from the other of said shafts at a speed different therefrom when said driving shaft directly drives said driven shaft, a pawl carried by said pawl carrying structure having a clutching portion adapted to move in response to centrifugal force exerted thereon into positive clutching engagement with said pawl engaging strucure at or above a predetermined speed, and latching means carried by said pawl, said latching means cooperating with said pawl engaging structure to prevent movement of the pawl toward clutching engagement with said pawl engaging structure until a reversal of relative rotation of said clutching structures is effected.

8. In an automatic clutch of the type adapted to connect a driving shaft with a driven shaft wherein said shafts are normally directly drivingly connected by a releasable driving means and wherein a gear train is arranged in driving connection with one of said shafts around said releasable driving means, said clutch comprising a clutching structure adapted to be driven by one of said shafts at the same speed therewith, a second clutching structure adapted to be driven from the other of said shafts by an element of said gear train at a speed different from that of the first said clutching structure when said driving shaft directly drives said driven shaft, one of said clutching structures being movable by centrifugal force into engagement with the other, and releasable latching means rotatable with one of said clutching structures, said latching means cooperating with the other of said clutching structures to prevent movement of said movable clutching structure during said direct drive.

9. An automatic clutch for drivingly connecting driving and driven shafts, comprising a clutching structure adapted to be driven by one of said shafts at the same speed therewith, a second clutching structure adapted to be driven from the other of said shafts at a speed different therefrom through a gear train when said driving shaft directly drives said driven shaft, one of said clutching structures comprising a centrifugal force operated pawl engageable with the other of said structures when the rotational speeds of said structures are approximately synchronized, and releasable latching means operably engaging said clutching structures and so constructed and arranged to hold said pawl against centrifugal force movement during said direct drive but releasing said pawl in response to predetermined variation in the relative rotational speeds of said clutching structures.

10. In an automatic clutch for drivingly connecting driving and driven shafts having releasable direct drive means operably associated therewith, said clutch comprising clutching structures respectively adapted for driving connection with said shafts for rotation in the same direction at relatively different speeds with one of said clutching structures leading the other during said direct drive, one of said clutching structures comprising a plurality of clutching elements operated by centrifugal force to positively clutch with the other of said clutching structures when the rotational speeds thereof are approximately synchronized, and means operably engaging said clutching elements and the last said clutching structure for releasably holding said clutching elements against centrifugal force movement during said direct drive, said holding means operating to release said clutching elements in response to approximate synchronized rotation of said clutching structures.

11. In combination with driving and driven shafts, releasable direct drive means between said shafts, relatively rotatable clutching structures one comprising a cage having a centrifugal force operated pawl adapted to engage the other of said structures when the speeds of said structures are approximately synchronized, means for driving said clutching structures at relatively different speeds, one from said driving shaft and the other from said driven shaft during said direct drive, and means carried by one of said clutching structures in engagement with the other of said clutching structures, the last said means connecting said cage and pawl for releasably holding said pawl against centrifugal force movement during said direct drive and for releasing said pawl in response to a predetermined drop in rotational speed of the faster rotating clutching structure relative to the speed of the other of said clutching structures.

12. In a centrifugal clutch for drivingly connecting driving and driven shafts, clutching structures respectively drivingly connected to said shafts for relative rotation at relatively different predetermined speeds, a pawl structure carried by one of said clutching structures and adapted for centrifugal force projection relative thereto in response to rotation thereof at or above a predetermined clutching speed, the other of said clutching structures having means accommodating positive clutching engagement by said pawl structure, said pawl and pawl-engaged structures being so constructed and arranged as to limit clutching thereof to approximate synchronized rotation thereof, means yieldingly acting to oppose projection of said pawl structure and to return said pawl structure from its clutched position to a retracted declutched position thereof in response to predetermined drop in the rotational speeds of said clutching structures, two of said structures having recesses registered with each other only when said pawl structure is retracted, a detent ball disposed in said registered recesses to prevent projection of said pawl structure when rotated at a speed greater than said predetermined clutching speed and when said clutching structures are rotated at said relatively different predetermined speeds, one of said recesses accommodating movement of said detent ball therein out of registry with the other in response to predetermined reduction of rotational speed of one of said clutching structures to release said pawl structure for said clutching projection thereof.

OTTO E. FISHBURN.